United States Patent
Kim et al.

(10) Patent No.: US 9,220,289 B2
(45) Date of Patent: Dec. 29, 2015

(54) AMINO ACID SEASONING COMPOSITIONS COMPRISING L-GLUTAMIC ACID AND L-LYSINE

(71) Applicant: DAESANG CORPORATION, Seoul (KR)

(72) Inventors: Young-Duk Kim, Seongnam-si (KR); Ki Kueon Kang, Icheon-si (KR); Min Ho Han, Seongnam-si (KR); Dong Cheol Park, Suwon-si (KR); Jang-Ryul Oh, Seoul (KR); Bok Jun Park, Seoul (KR)

(73) Assignee: DAESANG CORPORATION, Seoul (KR)

( * ) Notice: Subject to any disclaimer, the term of this patent is extended or adjusted under 35 U.S.C. 154(b) by 0 days.

(21) Appl. No.: 14/557,236

(22) Filed: Dec. 1, 2014

(65) Prior Publication Data

US 2015/0086692 A1    Mar. 26, 2015

Related U.S. Application Data

(62) Division of application No. 13/462,684, filed on May 2, 2012, now abandoned.

(30) Foreign Application Priority Data

Sep. 30, 2011 (KR) .......... 10-2011-0099558
Dec. 28, 2011 (KR) .......... 10-2011-0144456

(51) Int. Cl.
  *A23L 1/228* (2006.01)
  *A23L 1/227* (2006.01)
  *A23L 1/22* (2006.01)

(52) U.S. Cl.
  CPC ............. *A23L 1/228* (2013.01); *A23L 1/227* (2013.01); *A23L 1/22083* (2013.01); *A23V 2002/00* (2013.01)

(58) Field of Classification Search
  CPC ............. A23V 2250/0618; A23V 2250/063; A23L 1/228
  See application file for complete search history.

(56) References Cited

U.S. PATENT DOCUMENTS

| 4,547,377 A | 10/1985 | Ogawa et al. |
| 4,563,359 A | 1/1986 | Shimizu et al. |
| 6,063,428 A | 5/2000 | Ekanayake et al. |
| 2010/0112186 A1 | 5/2010 | Tanizawa et al. |
| 2011/0064861 A1 | 3/2011 | Shimono et al. |

FOREIGN PATENT DOCUMENTS

| AT | 224422 | 11/1962 |
| GB | 1064417 | 4/1967 |
| GB | 1083189 | 9/1967 |
| GB | 1381655 | 1/1975 |
| JP | 36-18486 | 10/1961 |
| JP | 2011-062167 | 3/2011 |

OTHER PUBLICATIONS

PCT International Application No. PCT/KR2012/007827, International Search Report dated Mar. 28, 2013, 2 pages.

*Primary Examiner* — Nikki H Dees
(74) *Attorney, Agent, or Firm* — Lee, Hong, Degerman, Kang & Waimey

(57) ABSTRACT

The present invention relates to a complex amino acid seasoning composition, comprising L-glutamic acid and L-lysine; wherein the composition is in the amorphous form and exhibits pH 6.5-8.0 in an aqueous solution. In addition, the present invention relates to a preparation method of the complex amino acid seasoning composition. The present invention provides amino acid seasoning compositions with excellent sensory properties in terms of saltiness and umami by use of L-glutamic acid and L-lysine. In contrast to conventional technologies, the present invention enables to block bitterness and offensive odor originated from amino acid ingredients, providing health-friendly seasoning compositions with no sodium ingredient. The seasoning composition of the present invention can be prepared with no formation of L-glutamic acid•L-lysine crystals in a very convenient and cost-effective manner.

7 Claims, 3 Drawing Sheets

(A) 100X magnification (Bar=500 μm), (B) 500X magnification (Bar=100 μm)

(C) 1,000X magnification (Bar=50 μm), (D) 10,000X magnification (Bar= 5 μm)

| Item | Umami | Saltiness |
|---|---|---|
| Salt (STD) | 0.00 | 0.00 |
| LG (Lys, Glu) | 8.11 | 1.26 |
| MSG | 8.74 | 1.01 |
| HVP | 4.86 | 0.95 |
| YE | 4.24 | 0.70 |

AMINO ACID SEASONING COMPOSITIONS COMPRISING L-GLUTAMIC ACID AND L-LYSINE

CROSS-REFERENCE TO RELATED APPLICATIONS

This application is a divisional of U.S. patent application Ser. No. 13/462,684, filed on May 2, 2012, currently pending, which claims the benefit of earlier filing date and right of priority to Korean Patent Application Nos. 10-2011-0099558, filed on Sep. 30, 2011 and 10-2011-0144456, filed on Dec. 28, 2011, the contents of which are all hereby incorporated by reference herein in their entirety.

BACKGROUND OF THE INVENTION

1. Field of the Invention

The present invention relates to a complex amino acid seasoning composition and its preparation method, in particular, to a complex amino acid seasoning composition comprising L-glutamic acid and L-lysine having a taste enhancing potential to significantly enhance saltiness and umami, and its preparation method.

2. Description of the Related Art

L-Lysine is an essential amino acid in human that is likely to be deficient in oriental people of which main dish is cereal foods. It plays a role as a protein precursor for skeletal muscle. In addition, it has been reported to be involved in a variety of physiological functions including biosynthesis of carnitine facilitating fatty acid metabolism, promotion of calcium absorption for children's growth and development, and immune enhancing effects as well as enhancement of gastrointestinal system upon feeding with glutamic acid and/or arginine.

L-Glutamic acid is one of acidic amino acids found plentifully in animal proteins such as beef meats, chicken meats and poke meats, plant proteins such as tomato, beans, mushrooms and seaweeds, and breast milk. L-Glutamic acid plays a critical role in amino acid metabolism. Furthermore, it serves as a main precursor for glutamine capable of detoxification of ammonia. L-Glutamic acid is also highlighted as neurotransmitters involved in brain functions such as cognitive and memory potentials. L-Glutamic acid is a precursor for arginine, proline and glutathione, which contributes to not only integrity of mucous membrane but also promotion of intestinal tract development for nutrition absorption. In addition to this, L-Glutamic acid has been reported as a component of folic acid and a precursor for glutathione as antioxidants.

A seasoning is one of the most important materials in the food industry field. Monosodium glutamate (MSG) as a representative of seasonings has been widely used into various food products. Furthermore, other seasonings including yeast extract, hydrolyzed vegetable protein (HVP) and soy source are also frequently used. However, the conventional seasonings prepared by hydrolysis of protein sources have serious shortcomings such as amino acid-derived offensive odor, bitterness by non-hydrolyzed peptides and higher market price. In this regard, the conventional seasonings have limitations in a wider application to the food industry field.

In recent years, a multitude of intensive reaches have been made to develop novel seasoning materials with lower sodium content and higher nutritional factors that are helpful in prevention of metabolic syndromes as lifestyle diseases and healthy life.

U.S. Pat. No. 4,563,359 (1986) discloses seasoning compositions comprising a glutamate salt mixture for increasing umami taste and decreasing a sodium content, wherein potassium, ammonium and calcium ions as an inorganic couterion are mixed with glutamic acid. However, the seasoning compositions have shortcomings such as decrease in umami taste, inhomogeneous offensive odor affected by types of inorganic ions and decrease in safety and solubility. Therefore, it would be appreciated that the seasoning composition is not used as a general seasoning material as MSG, since there are limitations in their preparation and application to food products.

Japanese Pat. No. 18486 (1961) by Kyowa Corp. suggests technologies with formation of L-glutamic acid•L-lysine crystal salts. However, L-glutamic acid and L-lysine crystal are not homogeneously mixed because they show different solubility to crystallization solvents such as methyl alcohol and ethyl alcohol, which is very likely to induce problems in sensory properties such as bitterness, sourness and amino acid-derived offensive odor (see U.S. Pat. No. 4,563,359).

Furthermore, there are some prior patent publications on seasoning materials for improving tastes (umami and saltiness), nutrition and cost-effectiveness, including U.S. Pat. Pub. No. 20110064861 (2011) for glutamic acid-containing amino acid compositions and Korean Pat. No. 0130012 (2009) for branched chain amino acid (BCAA)-containing compositions.

Throughout this application, various patents and publications are referenced and citations are provided in parentheses. The disclosure of these patents and publications in their entities are hereby incorporated by references into this application in order to more fully describe this invention and the state of the art to which this invention pertains.

SUMMARY OF THE INVENTION

As described hereinabove, there have been few conventional technologies to enhance both saltiness and umami while a multitude of approaches have been successful in enhancing saltiness. In conventional technologies accompanied with formation of L-glutamic acid•L-lysine crystals in alcohols, it is very difficult to adjust a mixing ratio of L-glutamic acid and L-lysine. Where a relative amount of L-lysine becomes larger, offensive odor originated from amino acids becomes problematic. Where a relative amount of L-glutamic acid becomes larger, the problems of sensory properties such as sourness and bitterness occur.

The present inventors have made intensive researches to develop novel amino acid seasoning composition with excellent sensory properties (improved saltiness and umami) as well as improved nutritional properties (e.g., sodium reduction effects). As a result, we have developed plausible amino acid seasoning compositions prepared in such a manner that L-glutamic acid as acidic amino acids and L-lysine as basic amino acids are mixed at a mole ratio sufficient to exhibit pH 6.5-8.0 (preferably pH 6.5-7.8, more preferably pH 6.5-7.5) in an aqueous solution and then dried (e.g., by spray drying or freeze drying), thereby providing amino acid seasoning compositions with excellent sensory and nutritional properties in the non-crystalline form or amorphous form. According to the present invention, the amino acid seasoning compositions are provided with maintaining the initial mole ratio of L-glutamic acid and L-lysine and with no formation of L-glutamic acid•L-lysine crystals.

According to conventional technologies with formation of L-glutamic acid•L-lysine crystals, serious problems in sensory properties such as increase in sourness and bitterness are very likely to occur because of some limitations inherent in the production process.

Therefore, conventional approaches with formation of L-glutamic acid•L-lysine crystals are unsuitable in preparation of seasoning compositions. However, the complex amino acid seasoning composition of the present invention is completely free from the shortcomings of conventional technologies in terms of sensory properties and shows excellent sensory properties (improved saltiness and umami). The preparation method of the present invention with no formation of L-glutamic acid•L-lysine crystals is carried out in a more convenient and cost-effective manner than conventional technologies. In this regard, the present invention is advantageous over conventional technologies in terms of sensory properties, applicability and cost-effectiveness.

Accordingly, it is an object of this invention to provide a complex amino acid seasoning composition.

It is another object of this invention to provide a method for seasoning a food.

It is still another object of this invention to provide a food product or functional food product.

It is further object of this invention to provide a method for preparing a complex amino acid seasoning composition in the amorphous form.

Other objects and advantages of the present invention will become apparent from the detailed description to follow taken in conjugation with the appended claims and drawings.

DETAILED DESCRIPTION OF THIS INVENTION

Figure 1:
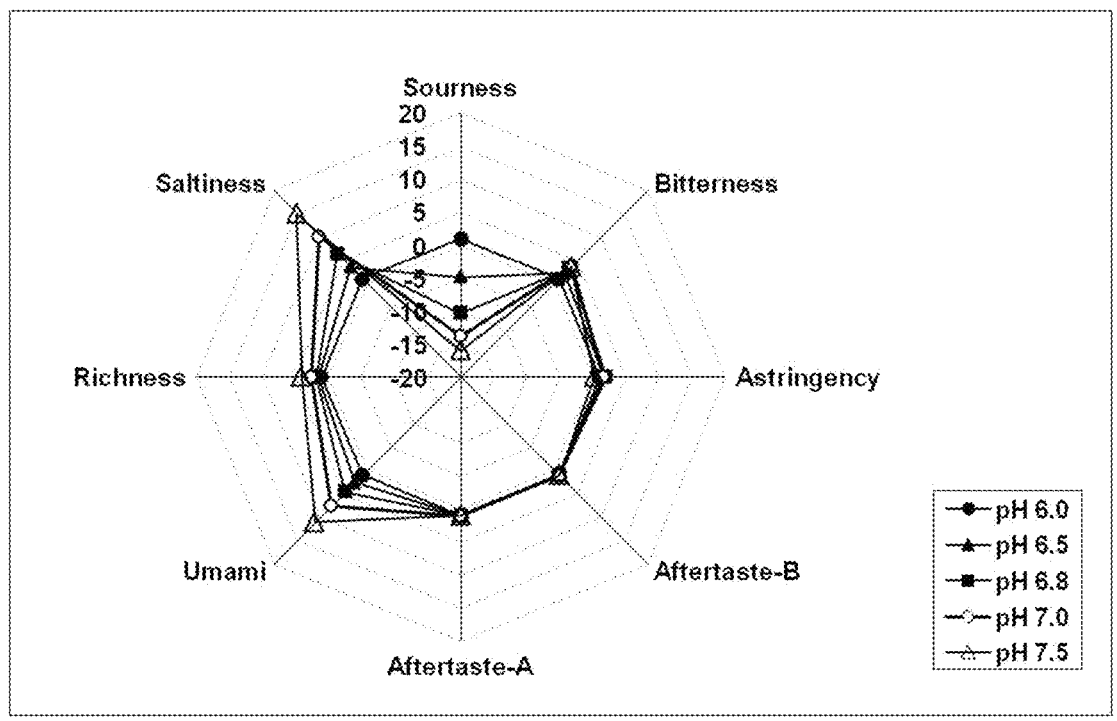
FIG. 1 represents analysis results using an electronic tongue system for sensory properties of the seasoning compositions of the present invention with different pH values (i.e., different mole ratios of L-glutamic acid to L-lysine).

In one aspect of the present invention, there is provided a complex amino acid seasoning composition, comprising L-glutamic acid and L-lysine; wherein the composition is in the amorphous form and exhibits pH 6.5-8.0 in an aqueous solution.

As described hereinabove, there have been few conventional technologies to enhance both saltiness and umami while a multitude of approaches have been successful in enhancing saltiness. In conventional technologies accompanied with formation of L-glutamic acid•L-lysine crystals in alcohols, it is very difficult to adjust a mixing ratio of L-glutamic acid and L-lysine. Where a relative amount of L-lysine becomes larger, offensive odor originated from amino acids becomes problematic. Where a relative amount of L-glutamic acid becomes larger, the problems of sensory properties such as sourness and bitterness occur.

The present inventors have made intensive researches to develop novel amino acid seasoning composition with excellent sensory properties (improved saltiness and umami) as well as improved nutritional properties (e.g., sodium reduction effects). As a result, we have developed plausible amino acid seasoning compositions prepared in such a manner that L-glutamic acid as acidic amino acids and L-lysine as basic amino acids are mixed at a mole ratio sufficient to exhibit pH 6.5-8.0 (preferably pH 6.5-7.8, more preferably pH 6.5-7.5) in an aqueous solution and then dried (e.g., by spray drying or freeze drying), thereby providing amino acid seasoning compositions with excellent sensory and nutritional properties in the non-crystalline form or amorphous form. According to the present invention, the amino acid seasoning compositions are provided with maintaining the initial mole ratio of L-glutamic acid and L-lysine and with no formation of L-glutamic acid•L-lysine crystals.

According to conventional technologies with formation of L-glutamic acid•L-lysine crystals, serious problems in sensory properties such as increase in sourness and bitterness are very likely to occur because of some limitations inherent in the production process.

Therefore, conventional approaches with formation of L-glutamic acid•L-lysine crystals are unsuitable in preparation of seasoning compositions. However, the complex amino acid seasoning composition of the present invention is completely free from the shortcomings of conventional technologies in terms of sensory properties and shows excellent sensory properties (improved saltiness and umami). The preparation method of the present invention with no formation of L-glutamic acid•L-lysine crystals is carried out in a more convenient and cost-effective manner than conventional technologies. In this regard, the present invention is advantageous over conventional technologies in terms of sensory properties, applicability and cost-effectiveness.

The term used herein "seasoning" refers to materials for altering or enhancing tastes or flavors of natural food products (e.g., meats and vegetables) and processed food products (e.g., candy and snack). The seasonings may be prepared by physical methods, chemical methods, microbial methods or enzymatic methods. The seasonings may be classified into natural seasonings, nature-equivalent seasonings and synthesized seasonings (The Flavourings in Food Regulations, Amended 1994).

The seasonings may be provided as either solid seasonings or liquid seasonings. The present invention may provide a liquid seasoning by preparation in aqueous solution or paste and a solid seasoning by drying process.

The prominent feature of the present invention is the amorphous form of the complex amino acid seasoning composition. The amorphous form is responsible for significant enhancement of saltiness and umami accomplished by the present invention. The conventional amino acid seasoning compositions containing L-glutamic acid and L-lysine have crystalline forms and therefore have shortcomings in terms of sensory properties such as increase in sourness and bitterness and offensive odors of amino acids, resulting in worse applicability as seasoning compositions (see U.S. Pat. 4,563,359).

The term used herein "amorphous form" also called as non-crystal form or non-crystalline form refers to forms lacks the long-range order characteristic of a crystal. The solids may be classified into solids in a crystal form with ordered planes and angles and solids in an amorphous form with non-ordered appearance.

Figure 2:
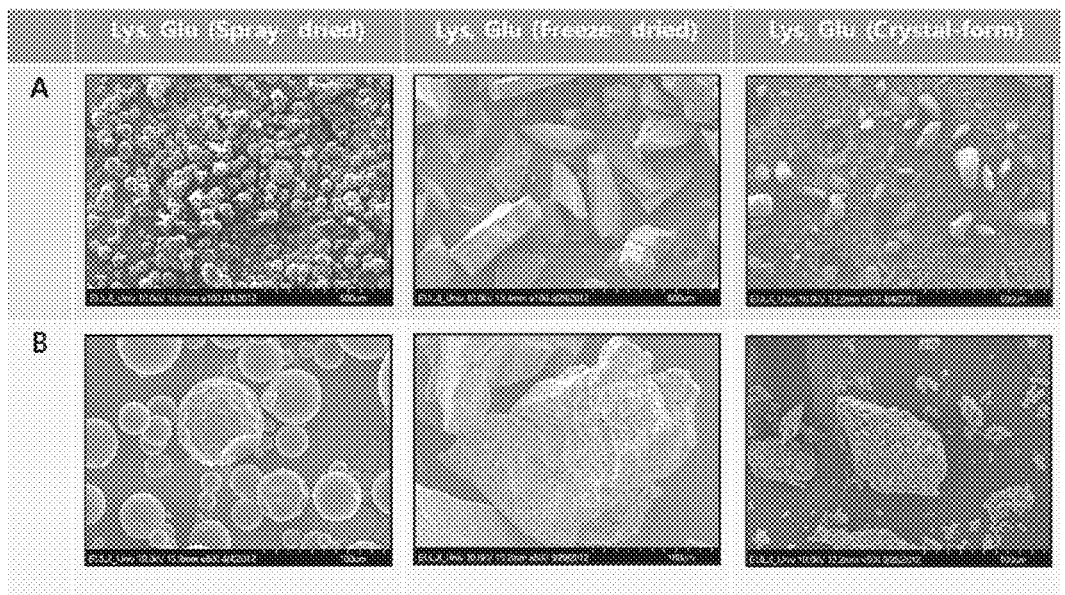
FIG. 2 represents images of electron microscopic observation on seasoning compositions in either the amorphous form or the crystalline form. The panel A corresponds to images at 100× magnification of scale and the panel B to images at 500× magnification of scale.
Figure 3:
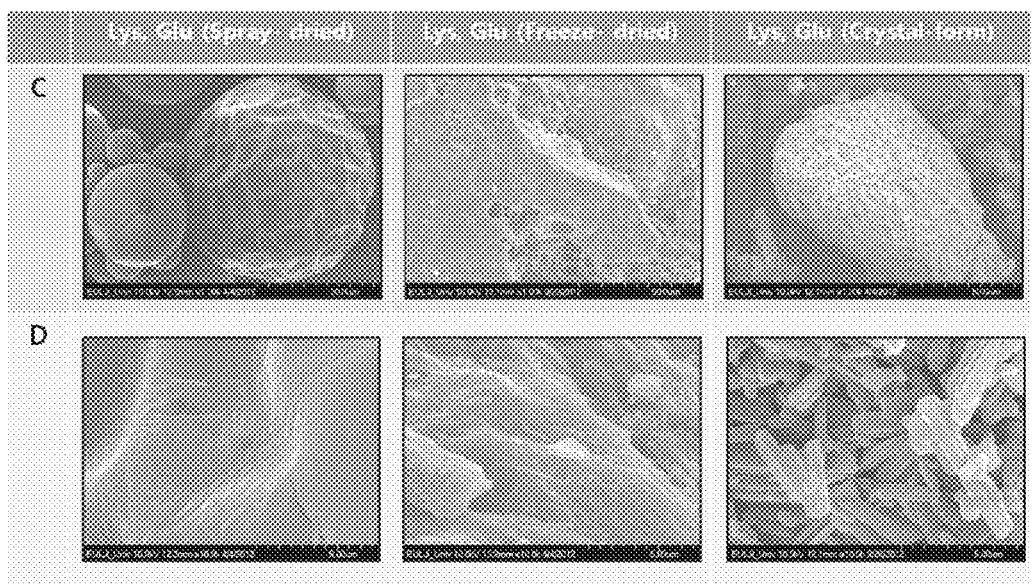
FIG. 3 represents images of electron microscopic observation on seasoning compositions in either the amorphous form or the crystalline form. The panel C corresponds to images at 1000× magnification of scale and the panel D to images at 10000× magnification of scale.

The seasoning composition of the present invention is in the amorphous form, which has been observed by electron microscope analysis (see Example 2, FIGS. 2 and 3). The amorphous form of the present seasoning composition has been distinctly different from conventional seasoning compositions with L-glutamic acid•L-lysine crystals under electron microscope observations (see Example 2, FIGS. 2 and 3).

The seasoning composition of the present invention comprises L-glutamic acid and L-lysine. Preferably, L-glutamic acid and L-lysine contained in the present composition are in the free base form. The free base forms of L-glutamic acid and L-lysine are helpful in adjusting accurately pH range of the present composition. For adjustment of pH value, it is critical to homogeneously mix L-glutamic acid (in the form of solution or powder) as acid amino acids and L-lysine (in the form of solution or powder) as basic amino acids. Preferably, the L-glutamic acid powder and L-lysine powder are homogeneously mixed in a solution (preferably, aqueous solution). Interestingly, the initial amount and mole ratio of L-glutamic acid and L-lysine is not substantially altered in the final seasoning composition, contributing to excellent sensory properties of the present composition.

L-glutamic acid used may be prepared in accordance with various methods known to one of skill in the art such as fermentation using suitable microbes.

According to a preferred embodiment, L-glutamic acid used is in the free base form, more preferably in the free base form with no counterions. The conventional amino acid seasoning compositions generally contain L-glutamic acid in the salt form, whereas the present seasoning composition contains L-glutamic acid in the free base form.

According to a preferred embodiment, L-glutamic acid is in the amount of 30-90 wt % or 40-90 wt %, more preferably 30-60 wt %, still more preferably 40-50 wt %, still further more preferably 45-49.2 wt %, most preferably 48.5-49.2 wt % based on the total weight of the composition.

According to the present invention, L-lysine as basic amino acids is selected as partners to synergistically enhance sensory properties of the present seasoning composition along with L-glutamic acid.

L-lysine used may be prepared in accordance with various methods known to one of skill in the art such as fermentation and purification. For instance, L-lysine used may be prepared in such a manner that L-lysine in the crystalline salt form (e.g., L-lysine hydrochloric acid salt) is dissolved and desalted through cation exchange column. In addition, L-lysine used may be prepared by purification of liquid fermented products to obtain L-lysine with higher purity.

According to a preferred embodiment, L-lysine used is in the free base form, more preferably in the free base form with no counterions.

According to a preferred embodiment, L-lysine is in the amount of 10-70 wt % or 10-60 wt %, more preferably 40-70 wt %, still more preferably 50-60 wt%, still further more preferably 50.8-55.0 wt %, most preferably 50.8-51.5 wt % based on the total weight of the composition.

To our best knowledge, the present invention is the first attempt in which L-glutamic acid is mixed with L-lysine at a specific mole ratio to enhance sensory properties of seasoning compositions, providing improved seasoning compositions. The two types of amino acids are used at a mole ratio sufficient to show pH 6.5-8.0 (preferably pH 6.5-7.8, more preferably pH 6.5-7.5) in an aqueous solution, leading to significant improvement in sensory properties of the seasoning composition of the present invention.

One of the critical factors determining sensory properties of the seasoning composition of the present invention is a pH value at a liquid state. The pH value of the present seasoning composition at an aqueous state is 6.5-8.0, preferably 6.5-7.8 or 6.7-7.6, more preferably 6.5-7.8 or 6.8-7.5, still more preferably 7.0-7.2.

The adjustment of pH values ensures to increase saltiness, umami and richness and decrease sourness, thereby considerably improving overall sensory properties.

According to a preferred embodiment, the mole ratio of L-glutamic acid to L-lysine in the present composition is 0.8-1.1:0.9-1.2, more preferably 0.9-1.0:1.0-1.1. The mole ratio is a determinant factor in improving sensory properties of the seasoning composition of the present invention.

According to a preferred embodiment, L-glutamic acid and L-lysine in the present seasoning composition are not substantially linked to each other by a covalent bond and an ionic bond. In the present invention, a covalent bond and an ionic bond between L-glutamic acid and L-lysine may deteriorate sensory properties of the present seasoning composition. By exclusion of a covalent bond and an ionic bond between L-glutamic acid and L-lysine, the present invention accomplish considerable improvement in sensory properties.

According to a preferred embodiment, the composition of the present invention has a taste enhancing potential to enhance saltiness and umami. Therefore, the present seasoning composition may not only replace a sodium ingredient but also exhibit better performance as seasonings.

In another aspect of this invention, there is provided a method for seasoning a food, comprising:
(a) selecting a food product; and
(b) applying the complex amino acid seasoning composition to the food.

In still another aspect of this invention, there is provided a food product or functional food product, comprising the complex amino acid seasoning composition.

Since the present invention uses the complex amino acid seasoning composition described above, the common descriptions between them are omitted in order to avoid undue redundancy leading to the complexity of this specification.

The food of the present invention is any food product known to one skilled in the art, including natural food products, meat processed food product, dairy food products, instant food products, fermented food products, noodle food products, meats (including raw, cooked, and dried meats), vegetables (including raw, pickled, cooked, and dried vegetables), fruits (including raw, cooked, and dried fruits), grains (including dried cereals and breads), processed foods (such as dried, canned or jarred sauces and soups) and snack foods, but not limited to.

In further aspect of this invention, there is provided a method for preparing a complex amino acid seasoning composition in the amorphous form, comprising:
(a) mixing L-glutamic acid and L-lysine in a solution at a mole ratio sufficient to exhibit pH 6.5-8.0; wherein L-glutamic acid and L-lysine are in the free base form; and
(b) drying the mixture of the step (a) to prepare a complex amino acid seasoning composition in the amorphous form.

Since the present invention is intended to prepare the complex amino acid seasoning composition described above, the common descriptions between them are omitted in order to avoid undue redundancy leading to the complexity of this specification.

The present method as an optimal preparation protocol for the complex amino acid seasoning composition of the present invention may provide an amino acid seasoning composition having excellent sensory properties in a relatively convenient manner.

L-glutamic acid and L-lysine in the free base form are mixed in a solution at a mole ratio to provide a mixture. The solution used is preferably water.

According to a preferred embodiment, L-lysine is used in the amount of 10-60 wt % based on the total weight of the mixture and the mole ratio of L-glutamic acid to L-lysine is 0.9-1.0:1.0-1.1.

According to a preferred embodiment, the mixture exhibits pH 6.5-7.8.

According to a preferred embodiment, L-glutamic acid and L-lysine in the complex amino acid seasoning composition are in the free base form.

According to a preferred embodiment, L-glutamic acid and L-lysine in the complex amino acid seasoning composition are in the non-crystalline form.

According to a preferred embodiment, L-glutamic acid and L-lysine in the complex amino acid seasoning composition are not substantially linked to each other by a covalent bond and an ionic bond.

According to a preferred embodiment, the complex amino acid seasoning composition has a taste enhancing potential to enhance saltiness and umami.

According to a preferred embodiment, the mole ratio of the mixture in the step (a) is substantially maintained in the complex amino acid seasoning composition prepared in the step (b).

The drying in the step (b) may be carried out by a variety of conventional methods. For example, the mixture may be dried by either spray dry (SD) or freeze dry (FD).

The spray dry is a process to dehydrate or dry a liquid product containing at least one ingredient, giving products in the form of powder, fined granule or granule. The spray dry method is suitable in continuous preparation of dried solid products in the form of powder, fined granule, granule or aggregate from a liquid source such as solution, suspension and paste. The product obtained by the spray dry free-flowing particles with well-defined characteristics in terms of shape and size of particles and residual water content. Where water is employed as fluid, the temperature of dried air for spray dry is preferably 120-200° C., more preferably 140-180° C. According to a preferred embodiment, the temperature of air at outlet 80-120° C., more preferably 90-110° C.

The features and advantages of this invention will be summarized as follows:

(a) The present invention provides amino acid seasoning compositions with excellent sensory properties in terms of saltiness and umami by use of L-glutamic acid and L-lysine.

(b) In contrast to conventional technologies, the present invention enables to block bitterness and offensive odor originated from amino acid ingredients, providing health-friendly seasoning compositions with no sodium ingredient.

(c) The seasoning composition of the present invention can be prepared with no formation of L-glutamic acid•L-lysine crystals in a very convenient and cost-effective manner. The seasoning composition of the present invention is completely free from problematic sensory properties of conventional seasoning compositions in the form of L-glutamic acid•L-lysine crystals. Furthermore, the seasoning composition of the present invention is excellent in light of nutrition.

Consequently, the seasoning composition of the present invention is significantly advantageous over conventional technologies in terms of sensory properties, applicability and cost-effectiveness.

The present invention will now be described in further detail by examples. It would be obvious to those skilled in the art that these examples are intended to be more concretely illustrative and the scope of the present invention as set forth in the appended claims is not limited to or by the examples.

EXAMPLES

Example 1

Preparation of L-Glutamic Acid/L-lysine Complex Amino Acid Seasoning Composition L-Lysine in the free base form (hereinafter referred to as L-lysine) was used. Alternatively, L-lysine was prepared from L-lysine hydrochloric acid salt by desalting and purification.

L-Lysine was commercially available or prepared by the present inventors. For example, the preparation of L-lysine may be performed as follows: Fermentation is carried out using a Corynebacteria strain to obtain a fermented medium containing lysine. The fermented medium containing lysine is centrifuged to remove the bacteria and the resulting supernatant is loaded onto strong-acid cation exchange column to adsorb lysine and remove residual sugars and anion species. The lysine adsorbed is eluted using ammonium hydroxide ($NH_4OH$) and the elutant is then applied to strong-base anion exchange column to adsorb colorants for discoloration. The fractions containing L-lysine are incubated with 5 wt % activated charcoal for 30 min for discoloration and filtered, followed by passing through a sterile filter of less than 0.45 μm. The L-lysine liquid sterilized is concentrated to more than 50 wt % concentration and used. Alternatively, the concentrated L-lysine liquid is dried by spray dry to obtain L-lysine powder with more than 98 wt % L-lysine.

L-Glutamic acid was commercially available or prepared by the present inventors. For example, the preparation of L-glutamic acid may be performed as follows: Fermentation is carried out using a bacteria strain to obtain a fermented medium containing glutamic acid. After removal of the bacteria, the fermented medium containing glutamic acid is adjusted to show pH 3.2-3.4 and crystallized to yield glutamic acid crystals. The glutamic acid crystal is dissolved in water and then re-crystallized, followed by drying to obtain L-glutamic acid in the free base form.

The L-glutamic acid powder and the L-lysine powder (or its hydrated solution) was mixed or agitated at a specific mole ratio in water to give a homogeneous solution. The homogeneous solution was adjusted to show pH 6.5-7.5 by controlling the mole ratio of L-lysine to L-glutamic acid (e.g., 1.00:0.98, pH 7.2 at 5 wt % concentration), thereby giving a homogeneous solution having more than 30 mole wt % of L-lysine and L-glutamic acid. The solution was filtered for sterilization (0.45 μm MF) and dried by spray dry or freeze dry to yield seasoning powder in the amorphous form. The dried products contain amino acids of more than 98 wt % (based on dry weight) and water of less than 12 wt %.

Example 2

Analysis of Particle Shape and Size Distribution of L-glutamic Acid/L-lysine Complex Amino Acid Seasoning Composition The non-crystalline mixed solution of L-glutamic acid and L-lysine prepared in Example 1 was dried in accordance with spray dry (SD) or freeze dry (FD). In addition, the powder of L-glutamic acid•L-lysine crystals was prepared as previously reported.

Briefly, methyl alcohol was introduced into a mixed solution of L-glutamic acid and L-lysine and heated, followed by homogenization. The homogenized solution was cooled to produce L-glutamic acid•-lysine crystals and dried to yield the powder of L-glutamic acid•L-lysine crystals.

Particle shape and size distribution analyses for the three types of powder were undertaken.

The particle shape was analyzed under an electron microscope. A carbon tape was attached to stub and each sample to be analyzed was then attached onto the carbon tape, followed by drying at 30° C. for 2 hr in a vacuum drying oven. The dried sample was subjected to PT coating for 120 sec using a platinum deposition devise (Hitachi E-1030). Afterwards, the stub was placed onto a scanning electron microscope (SEM, Hitachi S-4700) for observation. The particle size distribution was measured using Microtrac S3500. The samples were prepared in the powder form and ethanol was used as fluid. The running time was 30 sec and the particle size distribution was calculated with the average value of three independent measurements.

FIGS. 2 and 3 are images of electro microscopic observation (FIG. 2, panel A (100×) and panel B (500×); FIG. 3, panel C (1000×) and panel D (10000×)). As shown in FIGS. 2 and 3, the spray-dried powder (SD) of L-glutamic acid/L-lysine prepared by the present invention was observed as amorphous (non-crystalline) particles. The size distribution and the average size of the spray-dried powder were measured as 7.0-325.0 µm and 61.83 µm, respectively. The freeze-dried powder (FD) of L-glutamic acid/L-lysine prepared by the present invention was also observed as amorphous (non-crystalline) particles. The size distribution and the average size of the freeze-dried powder were measured as 6.0-995.5 µm and 471.7 µm, respectively. Meanwhile, the size distribution and the average size of the L-glutamic acid•L-lysine crystals were analyzed as 2.5-995.5 µm and 388.3 µm, respectively.

It was clearly observed that the powders (SD and FD) of L-glutamic acid/L-lysine prepared by the present invention had distinctly different particle shapes and sizes from those of the L-glutamic acid•-lysine crystals.

These electron microscopic analyses urge us to reason that the seasoning composition containing L-glutamic acid/L-lysine prepared by the present invention has the amorphous form and distinctly different particle characteristics from those of the L-glutamic acid•L-lysine crystals prepared by conventional technologies, which contributes to sensory properties of the seasoning composition of the present invention.

Example 3

Sensory Evaluation of Seasoning Composition with Different Mole Ratios of L-glutamic Acid and L-lysine The seasoning compositions with different mole ratios of L-glutamic acid and L-lysine were prepared by the present method. For example, L-glutamic acid in free base form (M.W., 147.1) was added into 200 ml of aqueous solution containing 10 g of L-lysine in the free base form (M.W., 146.2) and mixed at a mole ratio of 1.0-1.1:0.9-1.0 (L-glutamic acid to L-lysine). The resulting aqueous solution was measured to have pH values of 6.0-7.5.

Depending on mole ratios of L-glutamic acid to L-lysine used, the pH values of the seasoning composition in a liquid phase were changed. The sensory evaluation were carried out by panes of professional assessors (n=12) for determining difference of sensory properties depending on mole ratios of L-glutamic acid to L-lysine used.

As the amount of L-lysine became larger than that of L-glutamic acid, the umami taste of the seasoning compositions was increased. The seasoning compositions having pH values of more than 6.45 were evaluated to have preference in overall sensory properties (see Table 1). Meanwhile, the amount of L-lysine became larger than that of L-glutamic acid, the offensive odor originated from amino acids was increased. In particular, the seasoning compositions having pH values of more than 7.54 were evaluated to have worse odor.

TABLE 1

| pH | Mole ratio (Lysine:Glutamic acid) | Umami (n = 12) | Offensive odor (n = 12) |
|---|---|---|---|
| 6.03 | 1.00:1.02 | (+) | (+++) |
| 6.45 | 1.00:1.01 | (+) | (++) |
| 6.83 | 1.00:0.99 | (++) | (+) |
| 7.03 | 1.00:0.97 | (+++++) | (++) |
| 7.54 | 1.00:0.93 | (+++++) | (+++++) |

Consequently, it would be understood that the complex amino acid seasoning composition of the present invention can accomplish optimal sensory properties such as umami taste by adjusting its pH value. The adjustment of pH value can be conveniently performed by mixing L-glutamic acid and L-lysine at a suitable ratio, finally providing amino acid seasoning compositions in the amorphous form. In contrast, conventional technologies to prepare L-glutamic acid•L-lysine crystals have serious problems in establishing pH conditions for optimal sensory properties such as umami taste, because pH values of seasoning compositions containing L-glutamic acid•L-lysine crystals are difficult to be adjusted.

Example 4

Sensory Evaluation of Seasoning Composition with Different pH Values

The sensory properties were evaluated for the seasoning compositions prepared in Example 3 by use of an electronic tongue system (Sensing System TS-5000Z, Insent Inc. Japan). The measurement was carried out until 5 electrodes immersed in 35 ml of 1 wt % sample solution reached to equilibrium. The electrodes were washed and stabilized in a reference solution (containing 30 mM potassium chloride and 0.3 mM tartaric acid), and then each sample was analyzed. All measurements were performed in quadruplicate at room temperature.

Like to results described in Table 1, the sensory properties were greatly affected by the mole ratios of L-glutamic acid to L-lysine in the evaluation using the electronic tongue system (see FIG. 1). As the pH values of the seasoning compositions were increased (higher content of L-lysine), several sensory properties including saltness, umami and richness were increased and sourness was sharply dropped, resulting in dramatic improvement in overall sensory properties of the seasoning compositions. These results are consistent with those of the sensory preference analysis in Example 3.

Accordingly, it would be appreciated that the pH condition at mixing L-glutamic acid and L-lysine in a liquid phase plays a critical role in determining sensory properties (in particular, umami taste) of the seasoning compositions finally obtained. The optimal pH values range from 6.5 to 7.5, which are controlled by mixing L-glutamic acid and L-lysine at mole ratios of 0.9-1.0:1.0:1.1.

Example 5

Enhancement in Saltiness and Umami Tastes of L-Glutamic Acid/L-Lysine Mixed Powders The enhancement in saltiness and umami tates of L-glutamic acid/L-lysine mixed powders of the present invention was evaluated as comparative experiments with monosodium glutamate (MSG, Daesang Corp. Korea), yeast extract (Angel, China) and hydrolyzed vegetable protein (HVP, Givaudan, France). The sensory properties were evaluated for the seasoning compositions by use of the electronic tongue system as Example 4. Each sample to be measured was prepared by mixing 0.2 g of L-glutamic acid/L-lysine mixed powders of the present invention, MSG, yeast extract or HVP in 100 ml water containing 0.5 g NaCl.

Figure 4:
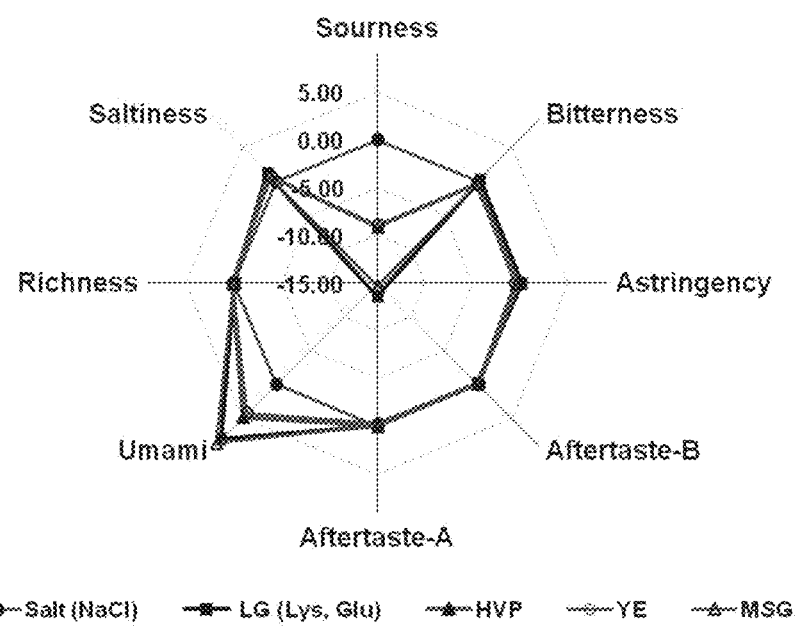
FIG. 4 represents analysis results using an electronic tongue system for sensory properties of the seasoning compositions of the present invention. The symbol "LG(Lys, Glu)" denotes the L-glutamic acid/L-lysine seasoning powder of the present invention. The sensory properties of salt (NaCl) are scored as 0. The scores for other seasonings are relative to those of salt (NaCl).

As represented in FIG. 4, the L-glutamic acid/L-lysine mixed powder of the present invention [LG(Lys, Glu)] shows significantly improved umami and saltiness tastes.

Having described a preferred embodiment of the present invention, it is to be understood that variants and modifications thereof falling within the spirit of the invention may become apparent to those skilled in this art, and the scope of this invention is to be determined by appended claims and their equivalents.

What is claimed is:

1. A complex amino acid seasoning composition, comprising a mixture of L-glutamic acid and L-lysine;
   wherein the complex amino acid seasoning composition is in an amorphous form and exhibits a pH of 6.5-8.0 in an aqueous solution, and
   wherein the L-glutamic acid and the L-lysine in the complex amino acid seasoning composition are not linked to each other by a covalent bond or by an ionic bond.

2. The complex amino acid seasoning composition according to claim 1, wherein a mole ratio of the L-glutamic acid to the L-lysine is 0.9-1.0:1.0-1.1.

3. The complex amino acid seasoning composition according to claim 1, wherein the complex amino acid seasoning composition exhibits pH 6.5-7.8 in the aqueous solution.

4. The complex amino acid seasoning composition according to claim 1, wherein the L-glutamic acid and the L-lysine used in the mixture are in a free base form.

5. The complex amino acid seasoning composition according to claim 1, wherein the L-glutamic acid and the L-lysine used in the mixture are in a non-crystalline form.

6. The complex amino acid seasoning composition according to claim 1, wherein the complex amino acid seasoning composition has a taste enhancing potential to enhance saltiness and umami.

7. The complex amino acid seasoning composition according to claim 1, wherein the complex amino acid seasoning composition is a powder, a fine granule or a non-fine granule.

* * * * *